United States Patent [19]

Gipson

[11] 4,248,399
[45] Feb. 3, 1981

[54] HOOK UNIT FOR TRUCK TIRE CHAINS

[76] Inventor: Donald G. Gipson, 1448 Vista Way, Red Bluff, Calif. 96080

[21] Appl. No.: 959,379

[22] Filed: Nov. 9, 1978

[51] Int. Cl.³ .............................................. E05B 73/00
[52] U.S. Cl. ..................................... 248/552; 70/212; 211/4; 211/8; 224/42.25; 224/42.45 R
[58] Field of Search ................ 280/769; 248/290, 294, 248/301, 303, 552, 203, 207, 211, 220.3, 220.1, 224.3, 225.1, 225.2, 304, 551, 553; 211/4, 5, 8; 24/241 SL, 241 R, 232 R, 73.5 G, 81.5 K, 230 AR; 70/19, 58, 212; 292/150, 148

[56] References Cited

U.S. PATENT DOCUMENTS

| | | |
|---|---|---|
| 327,939 | 10/1885 | Garrison . |
| 725,678 | 4/1903 | Cullum . |
| 739,326 | 9/1903 | Leonard ........................ 248/224.3 X |
| 754,483 | 3/1904 | Mustgrove . |
| 1,303,354 | 5/1919 | Miller ..................................... 70/212 |
| 1,377,413 | 5/1921 | Dwelle ................................. 70/19 X |
| 1,442,745 | 1/1923 | Timberlake ............................. 211/8 |
| 1,597,338 | 8/1926 | Bauer ............................. 248/304 X |
| 1,714,087 | 5/1929 | Goldhardt .............................. 211/8 |
| 1,719,272 | 7/1929 | Lee ......................................... 70/212 |
| 2,037,971 | 4/1936 | Ferren . |
| 2,046,815 | 7/1936 | Fike . |
| 2,425,629 | 8/1947 | Mayer . |
| 2,508,302 | 5/1950 | Stue . |
| 2,797,852 | 7/1957 | Michalski . |
| 2,963,895 | 12/1960 | Thomas ............................... 70/18 X |
| 3,260,489 | 7/1966 | Hentzi ............................. 248/304 X |
| 3,675,785 | 7/1972 | Martin ............................. 280/769 X |
| 3,817,064 | 6/1974 | Sallee . |
| 3,848,786 | 11/1974 | Baxter . |
| 3,918,279 | 11/1975 | Williamson ........................... 70/234 |
| 3,924,426 | 12/1975 | Zane et al. ............................. 70/18 |
| 3,963,156 | 6/1976 | Perrin ........................... 248/225.2 X |
| 4,039,220 | 8/1977 | Stoops ................................. 24/241 P |

FOREIGN PATENT DOCUMENTS

| | | | |
|---|---|---|---|
| 109240 | 3/1900 | Fed. Rep. of Germany .............. 211/4 |
| 184680 | 3/1906 | Fed. Rep. of Germany .............. 211/4 |
| 172028 | 6/1906 | Fed. Rep. of Germany .............. 211/4 |
| 2410271 | 10/1974 | Fed. Rep. of Germany .............. 70/18 |
| 2390925 | 1/1979 | France ..................................... 248/304 |
| 60739 | 3/1948 | Netherlands ............................. 248/304 |
| 336290 | 3/1959 | Switzerland ............................. 292/148 |
| 1173603 | 12/1969 | United Kingdom ..................... 248/552 |

Primary Examiner—James T. McCall
Attorney, Agent, or Firm—Roger B. Webster

[57] ABSTRACT

The hook unit of the present invention is adapted to receive truck tire chains when not in use, but which at times must be carried on the truck so as to be available in case of need therefor. The hook units are preferably employed in a pair and mounted in adjacent but laterally spaced relation on the truck; the truck tire chains, when out of use, being engaged with, spanning between, and depending from such pair of hook units. Each hook unit includes a bracket affixed to the truck, and an upwardly opening hook having an extension leg detachably engaged with the bracket whereby the hook may be detached and stored in those seasons or under road conditions when trucks do not need or carry tire chains.

In a modification of the hook unit and to prevent theft of the tire chains when hook-engaged, the extension leg of the hook is padlock-secured in the bracket, and a padlock-secured anti-theft bar spans the throat of the hook.

7 Claims, 15 Drawing Figures

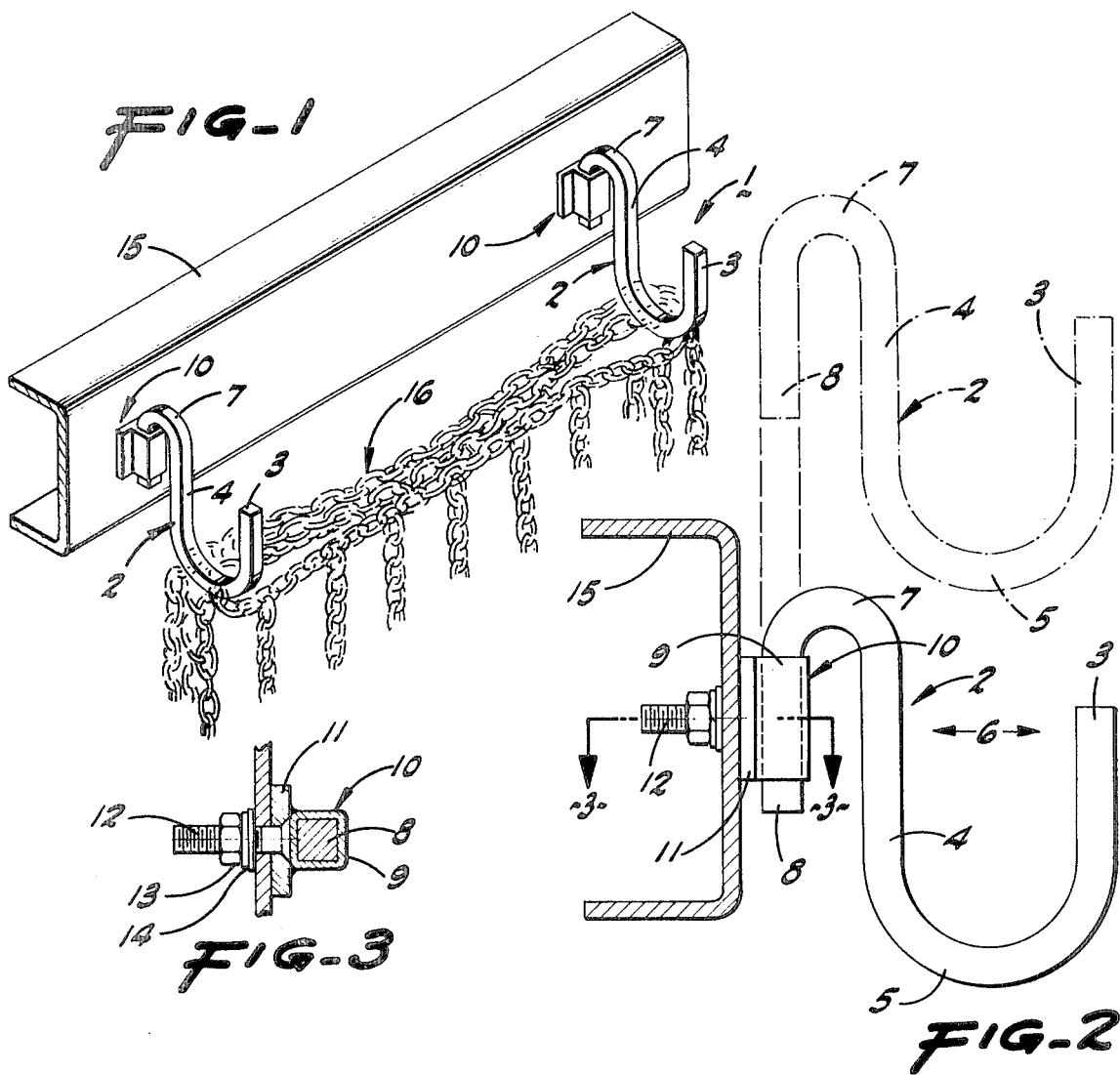
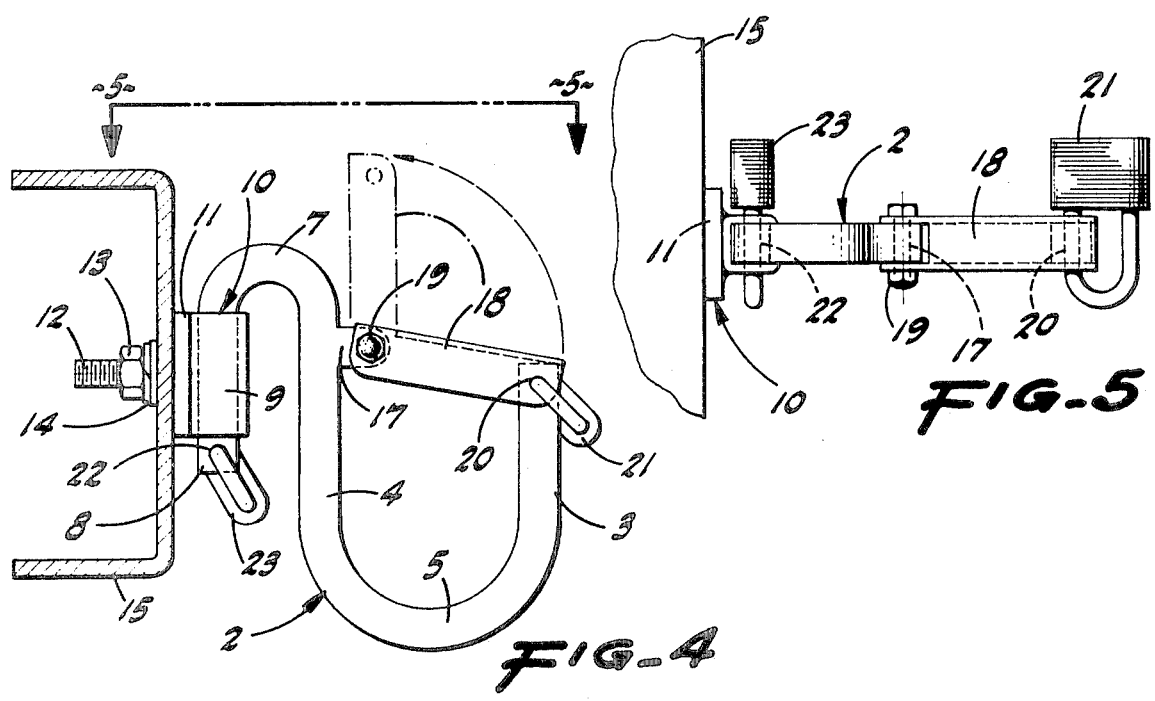

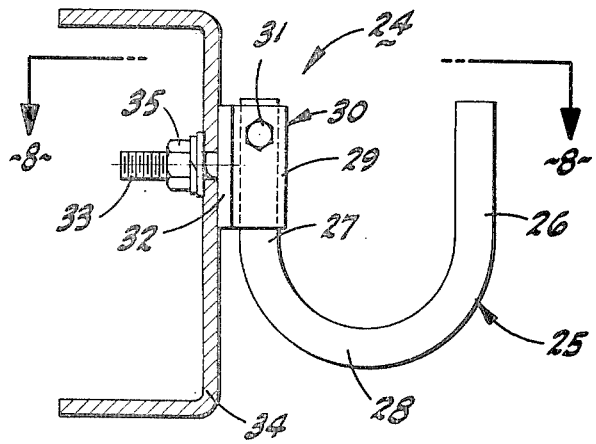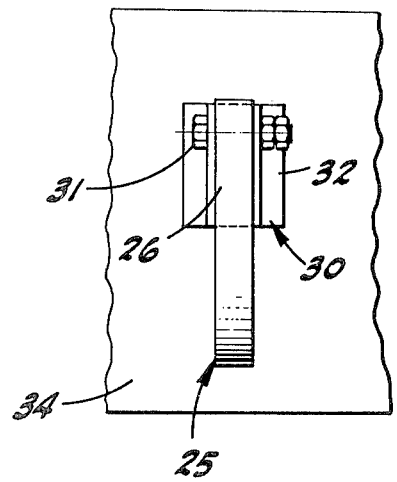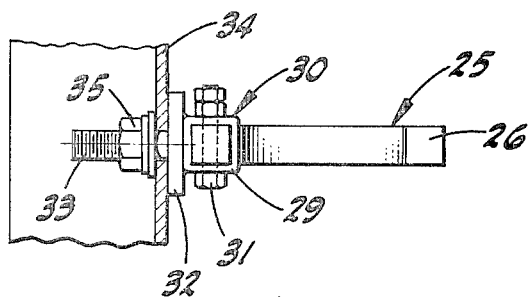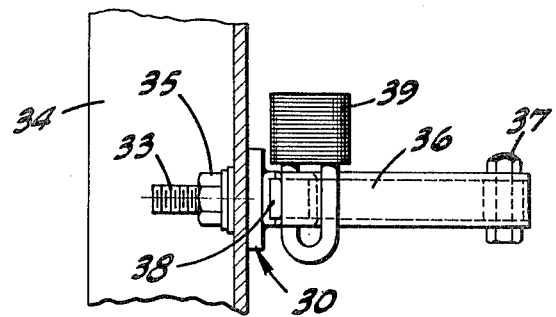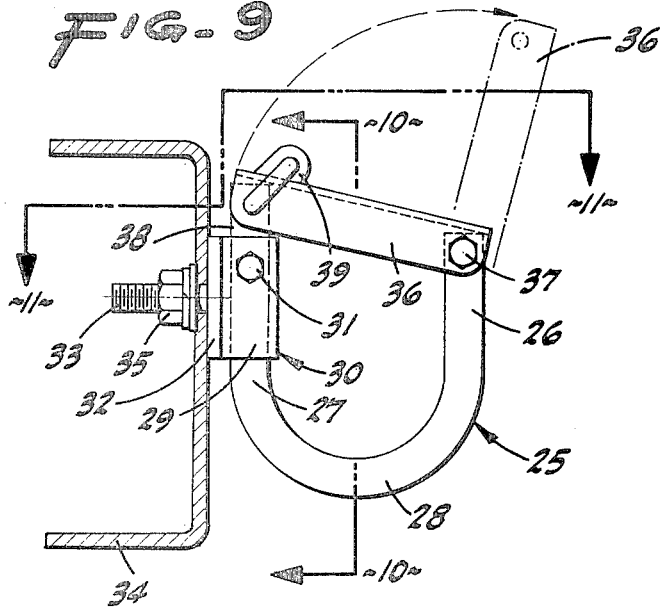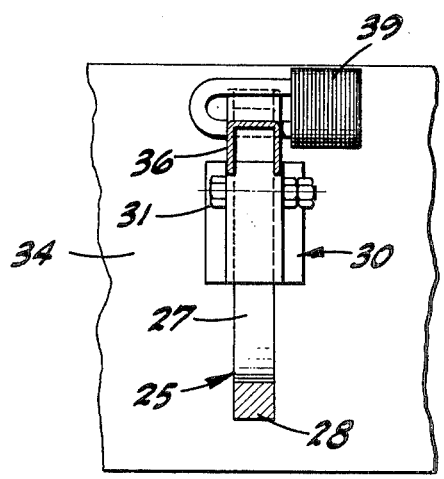

HOOK UNIT FOR TRUCK TIRE CHAINS

COPENDING APPLICATIONS

In its design aspects, the present hook unit, for truck tire chains, is the subject of pending United States design patent applications Ser. No. 925,408, filed July 17, 1978, and Ser. No. 925,410, filed July 17, 1978.

BACKGROUND OF THE INVENTION

1. Field of the Invention

It is common practice for trucks to carry tire chains in the wet season or when anticipated road conditions may require the use of tire chains; the chains—when not in use—being carried on the truck in various makeshift ways and which are frequently not too satisfactory. The present invention was conceived in a successful effort to produce an effective hook arrangement on a truck for receiving the tire chains when not in use.

2. The Prior Art

U.S. Pat. Nos. 327,939; 725,678; 754,483; 2,037,971; 2,046,815; 2,425,629; 2,508,302; 2,797,852; 3,260,489; 3,817,064; 3,848,786 and 4,008,587 represent the most relevant prior art known to applicant.

SUMMARY OF THE INVENTION

The present invention provides, as a major object, a hook unit, for truck tire chains, which is adapted to receive truck tire chains when not in use, but which must be carried on the truck so as to be available in case of need therefor; a pair—preferably—of the hook units being employed, with the hook units mounted in adjacent but laterally spaced relation on the truck, and the out-of-use truck tire chains being engaged with, spanning between, and depending from such pair of hook units.

The present invention provides, as another important object, a hook unit, for truck tire chains, which individually comprises a bracket affixed to the truck, and an upwardly opening hook having an attachment leg detachably engaged with the bracket whereby the hook may be detached and stored in those seasons or under road conditions when trucks do not need or carry tire chains.

The present invention provides, as still another important object, a hook unit, for truck tire chains, wherein—in a modification and to prevent theft of the tire chains when hook-engaged—the attachment leg of the hook is padlock-secured in the bracket, and a padlock-secured, anti-theft bar spans the throat of the hook.

The present invention provides, as a further object, a hook unit for truck tire chains which is designed for ease and economy of manufacture, ready installation, and convenience of use.

The present invention provides, as a still further object, a practical and reliable hook unit for truck tire chains, and one which is exceedingly effective for the purpose for which it is designed.

BRIEF DESCRIPTION OF THE DRAWINGS

FIG. 1 is an illustration of a pair of the hook units as mounted on a truck, with truck tire chains engaged with, spanning between, and depending from such hook units.

FIG. 2 is a side elevation of a hook unit as mounted for use; the hook, in broken lines, being shown detached.

FIG. 3 is a sectional plan on line 3—3 of FIG. 2.

FIG. 4 is a side elevation of the hook unit mounted for use and including a padlock-secured anti-theft bar, and with the hook padlock-secured in the bracket; the anti-theft bar—in broken lines—being shown in open position.

FIG. 5 is a plan view on line 5—5 of FIG. 4.

FIG. 6 is a side elevation of a modification of the hook unit as mounted for use.

FIG. 7 is a front elevation of the same.

FIG. 8 is a plane view thereof.

FIG. 9 is a side elevation of the hook unit of FIG. 6 mounted for use and including a padlock-secured, anti-theft bar and with the hook padlock-secured in the bracket; the anti-theft bar—in broken lines—being shown in open position.

FIG. 10 is a transverse sectional elevation of the same; the view being taken on line 10—10 of FIG. 9.

FIG. 11 is a plan view of the hook unit of FIG. 9.

DESCRIPTION OF THE PREFERRED EMBODIMENTS

Figure 12:
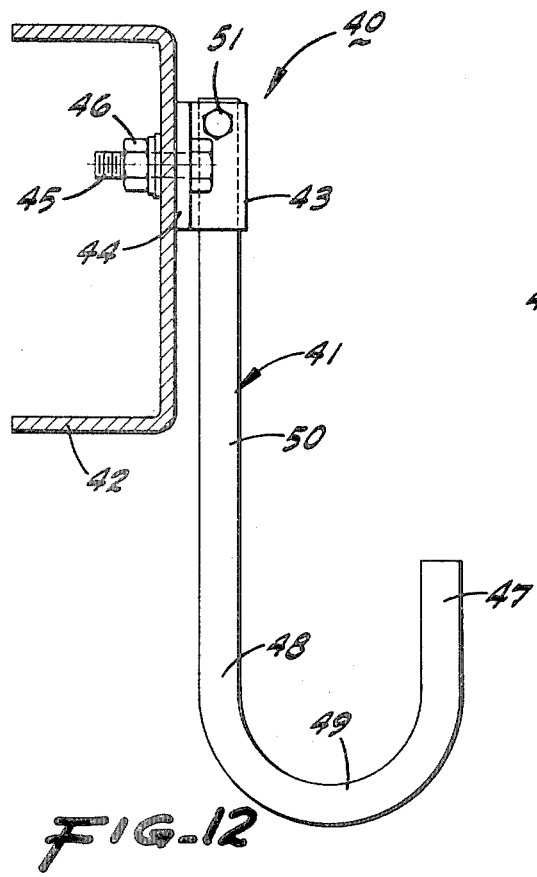
FIG. 12 is a side elevation of a modification of the hook unit as mounted for use.

Referring now more particularly to the drawings and to the characters of reference marked thereon, and especially at present to FIGS. 1-3, inclusive, each hook unit, indicated generally at 1, comprises an upwardly opening hook indicated generally at 2; such hook 2 including a vertical outer shank 3 and a vertical inner shank 4. The shanks 3 and 4 are connected in integral relation—at their lower ends—by a 180° upwardly facing, lower bend 5. The open upper end or throat of the hook is indicated at 6.

At its upper end, and as an extension thereof, the vertical inner shank 4 merges integrally with the front of a 180° downwardly facing, upper bend 7, which bend, in turn, at the rear, merges integrally, and as a furtherance of the extension, with a depending attachment leg 8 which engages downwardly in and through a vertical open-ended socket 9—of a bracket indicated generally at 10—permanently affixed on the face of a vertical back plate 11 included in such bracket. The bracket 10 further includes a horizontal threaded stud 12 fixed centrally on and projecting rearwardly from the back plate 11; such stud having a nut 13 threaded thereon with washers 14 surrounding the stud 12 between back plate 11 and nut 13.

The above-described hook unit 1 is mounted on a fixed member 15 (such as the frame) of the truck, and—through a hole in such member—the stud 12 projects, with the back plate 11 engaged against one face of said member, and with the nut and washer assembly 14 engaged tightly against the other face of such member.

When the hook unit 1 is in use, with the depending attachment leg 8 engaged in the socket 9, the out-of-use truck tire chains 16 are engaged on the hook 2; a pair of the hook units preferably being used in spaced-apart relation so that the out-of-use truck tire chains may be engaged on, and draped between such hook units in order to reduce the dependency of the chains from said hook units.

The hook 2, together with its extension including the depending attachment leg 8, is formed from a one-piece metal bar which is rectangular in cross section, and the vertical socket 9 includes a matching rectangular bore whereby—when such leg 8 is engaged in the socket 9—the hook 2 is held in an outwardly projecting, laterally immovable position.

At such times that the truck does not carry tire chains, each hook 2 is removed by withdrawing the attachment leg 8 upwardly out of the socket 9 whereby the hook may then be suitably stored on the truck in an out-of-the-way place.

In certain instances, and to provide each hook unit with an anti-theft mode as shown in FIGS. 4-5, the vertical inner shank 4 is formed—at its upper end—with a short, integral, forwardly projecting boss 17, and an anti-theft bar 18 is pivoted at its inner end, as at 19, on said boss 17; such anti-theft bar 18, when closed, spanning the throat 6 of hook 2 and lapping the upper end of the outer shank 3 of the hook. The outer end of the anti-theft bar 18 and the upper end of the outer shank 3 are provided with registering holes 20 for the reception therethrough of the bail of a padlock 21. More particularly, the anti-theft bar 18 is of downwardly opening channel form, and its outer end embraces the upper end of the outer shank 3, and which provides a stop and, without more, proper registry of the holes 20 which receive the bail of the padlock 21. Also, the boss 17 is disposed in a plane such that the anti-theft bar extends—when in closed position—at an outward and downward incline, and which aids in gravitational closing movement of the bar and assures that any object accidentally descending on the closed bar will slide away and escape. Additionally, the lower end of the depending attachment leg 8, and which is exposed below the lower end of the socket 9, is formed with a hole 22 for the reception of the bail of a padlock 23.

As secured by the padlocks 21 and 23, tire chains engaged on the hook 2 of each hook unit 1 are protected against unauthorized removal from such hook, and, further, the hook cannot be detached from the bracket 10. However, by the simple expedient of removing the padlock 21, the anti-theft bar 18 can be swung upwardly to an open position, and which permits the tire chains to be removed from the hook 2. Also, upon removal of the padlock 23, the hook can be detached from the bracket and stored when not needed.

In the embodiment of FIGS. 6-8, the hook unit, indicated generally at 24, comprises a hook indicated generally at 25; such hook including a vertical outer shank 26 and a vertical inner shank 27; the shanks 26 and 27 being integrally connected—at their lower ends—by a 180° upwardly facing, lower bend 28.

The upper portion of the inner shank 27 is engaged, from below, upwardly in a vertical open-ended socket 29 of a bracket, indicated generally at 30. Such upper end portion of the inner shank 27 is detachably secured in the socket 29 by a cross bolt 31 which extends through said engaged parts.

The socket 29 is permanently affixed on the face of a vertical back plate 32 included in the bracket 30; said bracket further including a horizontal threaded stud 33 fixed centrally on and projecting rearwardly from the back plate 32.

The hook unit, of FIGS. 6-8, is mounted on a fixed member 34 of a truck; the stud 33 projecting through a hole in such member 34, with the back plate 32 engaged tightly against one face of said member, by a nut and washer assembly 35 on stud 33 and bearing against the other face of the member.

The hook unit of FIGS. 6-8 is used in the same manner, and for the same purpose, as described in reference to the hook unit of FIGS. 1-5. However, in the hook unit of FIGS. 6-8, the engagement of the inner shank 27 of the hook with the bracket 29 from below is for the reason that the hook unit 24 can then be employed in an instance where the overhead clearance is limited or obstructed.

When it is desired to provide each hook unit 24 of FIGS. 6-8 in an anti-theft mode, and as shown in FIGS 9-11, an anti-theft bar 36 is pivoted at its outer end, as at 37, on the upper end of the vertical outer shank 26; the anti-theft bar thence extending inwardly in spanning relation to the throat of the hook 25, with the inner end of such bar embracing a vertical, upward extension 28 of the vertical inner shank 27 of the hook, and which extension projects above the upper end of socket 29.

The anti-theft bar 36 is of downwardly opening channel form, and inclines outwardly and downwardly from its inner end, and—at such inner end—said bar 36 embraces the upper end of extension 38 in stop relation. The bail of a padlock 39 passes through registering holes in the engaged portions of extension 38 and the anti-theft bar 36 whereby the latter in use is secured against unauthorized opening movement, and which would otherwise permit theft of the hook-engaged tire chains.

Figure 13:
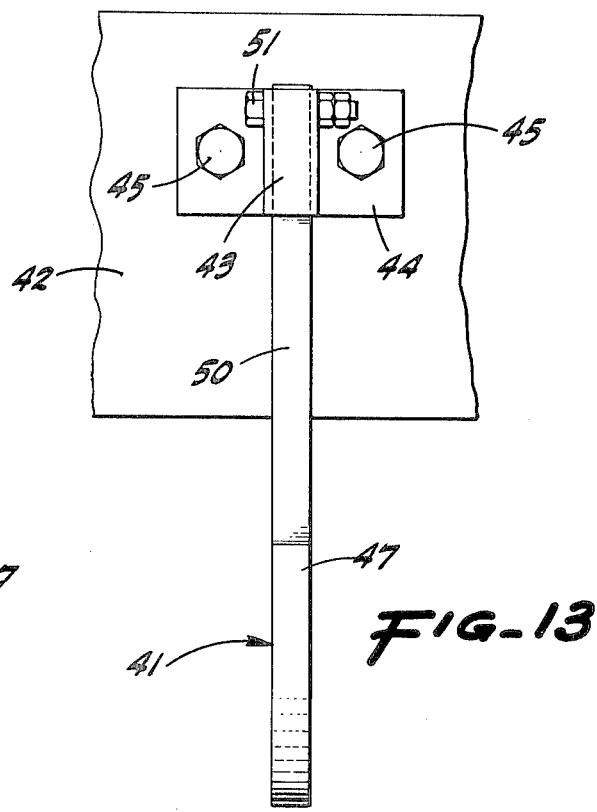
FIG. 13 is a front elevation of the same.

In some installations, it is desired that the hook unit—indicated generally at 40 and as shown in FIGS. 12 and 13—be formed so that the hook, indicated generally at 41, is disposed a substantial distance below the bracket secured to the truck member 42; the bracket comprising a vertical, open-ended socket 43 fixed on the front of a back plate 44 secured to the truck member 42 by transversely spaced bolts 45 having nut and washer assemblies 46 thereon.

The hook 41 includes a vertical outer shank 47, a vertical inner shank 48, and an integral, upwardly facing lower bend 49; the vertical inner shank 48 being formed with a relatively long or elongated, vertical, upward extension 50.

The upper portion of the extension 50 is engaged, from below, in the socket 43, and is detachably secured in such socket by a cross bolt 51; the elongation of said extension 50 being such that the hook 41 is disposed a substantial distance below member 42 and as necessitated, for example, by parts on the truck which would otherwise be obstructive to convenient use of the hook units.

Figure 14:
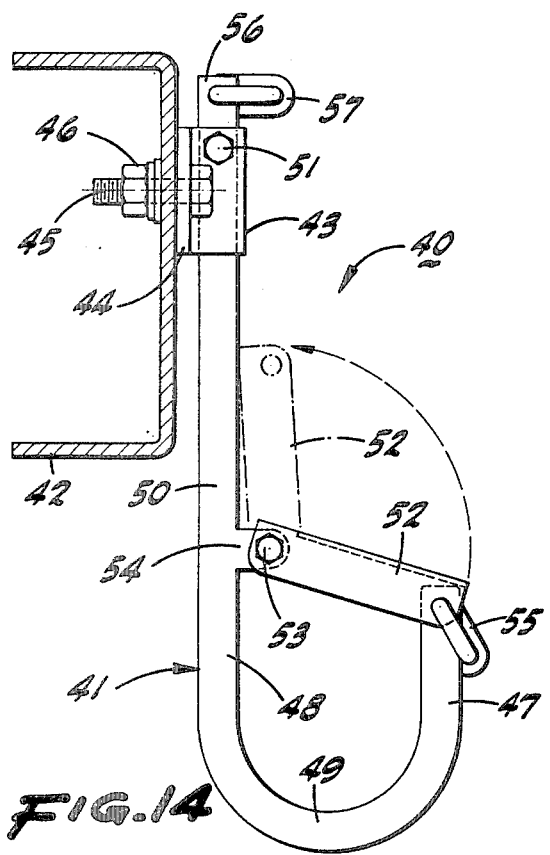
FIG. 14 is a side elevation of the hook unit of FIG. 12 mounted for use and including a padlock-secured, anti-theft bar, and with the hook padlock-secured in the bracket; the anti-theft bar—in broken lines—being shown in open position.
Figure 15:
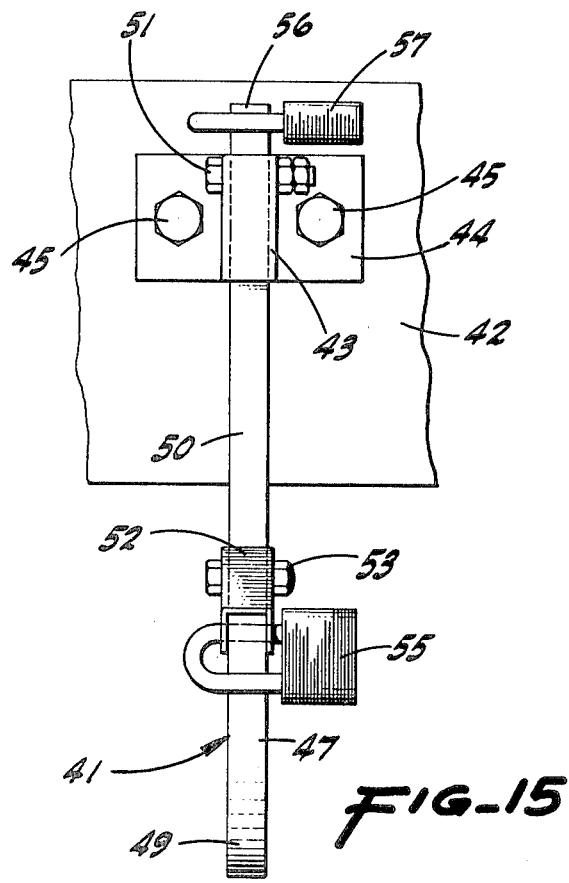
FIG. 15 is a front elevation of the same.

The hook unit 40 of FIGS. 12 and 13 may also be provided in an anti-theft mode as disclosed in FIGS. 14 and 15. This is accomplished—in much the same manner as in the arrangement of FIG. 4—by the inclusion of an inverted, channel-shaped, anti-theft bar 52 pivoted at its inner end, as at 53, on a boss 54 formed on the vertical inner shank 48; the anti-theft bar 52 thence projecting forwardly, at a downward incline, to embracing engagement—in stop relation—with the upper end of the vertical outer shank 47 of the hook 41. The outer end of the anti-theft bar 52 and the engaged upper end of the vertical outer shank are secured together by the bail of a padlock 55, and which bail passes through registering holes in such engaging parts.

Also, the upper end portion 56 of the extension 50 projects above the socket 43, and the bail of padlock 57 passes through a hole in such upper end portion 56. The padlocks 55 and 57—when in use—effectively maintain, respectively, the anti-theft bar in closed position, and the extension 50 against withdrawal from the socket 43.

The hook unit 40, of FIGS. 12-15, is employed in the same manner, and for the same purpose, as described in reference to the hook unit of FIGS. 1-5.

From the foregoing description, it will be readily seen that there has been produced such a hook unit for truck tire chains as substantially fulfills the objects of the invention as set forth herein.

While this specification sets forth in detail the present and preferred construction of the hook unit for truck tire chains, still in practice such deviations from such detail may be resorted to as do not form a departure from the spirit of the invention as defined by the appended claims.

I claim:

1. A truck tire chain hook unit comprising a bracket, the bracket being adapted to be secured on and in abutment with a fixed member of a truck, an upstanding socket rigid with the bracket and disposed wholly outwardly of said abutment, an upwardly opening hook projecting outwardly from the socket, the hook including an outer shank and an inner shank, said shanks being horizontally spaced, an integral extension of the inner shank providing an attachment leg, the attachment leg being non-circular in cross section and detachably engaged in the socket, the socket having an open-ended bore of like cross sectional configuration which receives the attachment leg in matching non-turnable relation whereby the hook is laterally immovable, the attachment leg engaging in the open-ended socket from one end thereof and projecting beyond the other end thereof, and said projecting end portion of the attachment leg having a hole formed therein for the reception of a bail of a padlock; the extension, which provides the attachment leg, upstanding from the upper end of the inner shank whereby said attachment leg engages in the open-ended socket from below, with said projecting portion, and the hole therein, disposed above the upper end of the socket, and means between the socket and attachment leg detachably securing the latter in the socket independently of the padlock.

2. A hook unit, as in claim 1, in which said securing means comprises a cross bolt extending through the socket and socket-engaged portion of the attachment leg detachably securing the latter in the socket.

3. A truck tire chain hook unit comprising a bracket, the bracket being adapted to be secured on and in abutment with a fixed member of a truck, an upstanding socket rigid with the bracket and disposed wholly outwardly of said abutment, an upwardly opening hook projecting outwardly from the socket, the hook including an outer shank and an inner shank, said shanks being horizontally spaced, an integral extension of the inner shank providing an attachment leg, the attachment leg being non-circular in cross section and detachably engaged in the socket, the socket having an open-ended bore of like cross sectional configuration which receives the attachment leg in matching non-turnable relation whereby the hook is laterally immovable, the attachment leg engaging in the open-ended socket from one end thereof and projecting beyond the other end thereof, and said projecting end portion of the attachment leg having a hole formed therein for the reception of a bail of a padlock; the extension, which provides the attachment leg, depending vertically in horizontally spaced relation inwardly of the inner shank whereby said attachment leg engages in the open-ended socket from above with said projecting portion, and the hole therein, disposed below the lower end of the socket, and means between the socket and attachment leg detachably securing the latter in the socket independently of the padlock.

4. A truck tire chain hook unit comprising a bracket, the bracket being adapted to be secured on and in abutment with a fixed member of a truck, an upstanding socket rigid with the bracket and disposed wholly outwardly of said abutment, an upwardly opening hook projecting outwardly from the socket, the hook including an outer shank and an inner shank, said shanks being horizontally spaced, an integral extension of the inner shank providing an attachment leg, the attachment leg being non-circular in cross section and detachably engaged in the socket, the socket having an open-ended bore of like cross sectional configuration which receives the attachment leg in matching non-turnable relation whereby the hook is laterally immovable, the attachment leg engaging in the open-ended socket from one end thereof and projecting beyond the other end thereof, and said projecting end portion of the attachment leg having a hole formed therein for the reception of a bail of a padlock; there being an anti-theft bar spanning the throat of the hook, means pivoting the anti-theft bar at its outer end in connection with the upper end of the outer shank for opening and closing movement, and the inner end of the anti-theft bar engaging the upper end of the projecting portion of the attachment leg in stop relation, and said inner end of the anti-theft bar having a part then side-lapping the projecting portion of the anti-theft bar, and said side-lapping part having a hole therethrough corresponding to and then in register with the hole in said projecting portion of the anti-theft bar, such registering holes receiving the bail of the padlock therethrough whereby to lock the anti-theft bar against unauthorized opening movement.

5. A truck tire chain hook unit comprising a bracket, the bracket being adapted to be secured on and in abutment with a fixed member of a truck, an upstanding socket rigid with the bracket and disposed wholly outwardly of said abutment, an upwardly opening hook projecting outwardly from the socket, the hook including an outer shank and an inner shank, said shanks being horizontally spaced, an integral extension of the inner shank providing an attachment leg, the attachment leg being non-circular in cross section and detachably engaged in the socket, the socket having an open-ended bore of like cross sectional configuration which receives the attachment leg in matching non-turnable relation whereby the hook is laterally immovable, the attachment leg engaging in the open-ended socket from one end thereof and projecting beyond the other end thereof, and said projecting end portion of the attachment leg having a hole formed therein for the reception of a bail of a padlock; the extension-formed attachment leg being substantially elongated above the upper end of the inner shank, a forwardly projecting boss formed on the inner shank adjacent its upper end, said substantial elongation of the attachment leg being above said boss, an anti-theft bar spanning the throat of the hook, and means transversely pivoting the anti-theft bar at its inner end on the boss for opening and closing movement; the outer end of the anti-theft bar engaging the upper end of the outer shank, in stop relation, when said bar is closed, and the outer end of the anti-theft bar having a part then side-lapping the upper end of the outer shank, said part and upper end of the outer shank having holes which register when the anti-theft bar is closed, and such registering holes receiving therethrough the bail of another padlock whereby to lock the anti-theft bar against unauthorized opening movement.

6. A truck tire chain hook unit comprising a bracket adapted to be secured on and in abutment with a fixed member of a truck, an upwardly opening hook projecting outwardly relative to the bracket, the hook including an outer shank and an inner shank, means securing the inner shank in connection with the bracket, the shanks being horizontally spaced and defining a throat at the top of the hook, an anti-theft bar spanning the throat of the hook, means pivoting the anti-theft bar at one end in connection with one shank for opening and closing movement, the other end of the anti-theft bar end-engaging the other shank of the hook, in stop relation, when the bar is closed, and said other end of the anti-theft bar having a part then side-lapping the other shank, said part and other shank having holes which register when the anti-theft bar is closed, and such registering holes receiving therethrough the bail of a padlock whereby to lock the anti-theft bar against unauthorized opening movement.

7. A hook unit, as in claim 6, in which the anti-theft bar is of inverted channel form and said other end thereof engages over the upper end of said other shank to provide said stop relation, the registering holes being in the side flanges of said channel-form anti-theft bar and in said other shank.

* * * * *